Dec. 7, 1943.  R. E. J. NORDQUIST ET AL  2,336,415
CAN FILLING MACHINE
Filed June 18, 1941   5 Sheets-Sheet 1
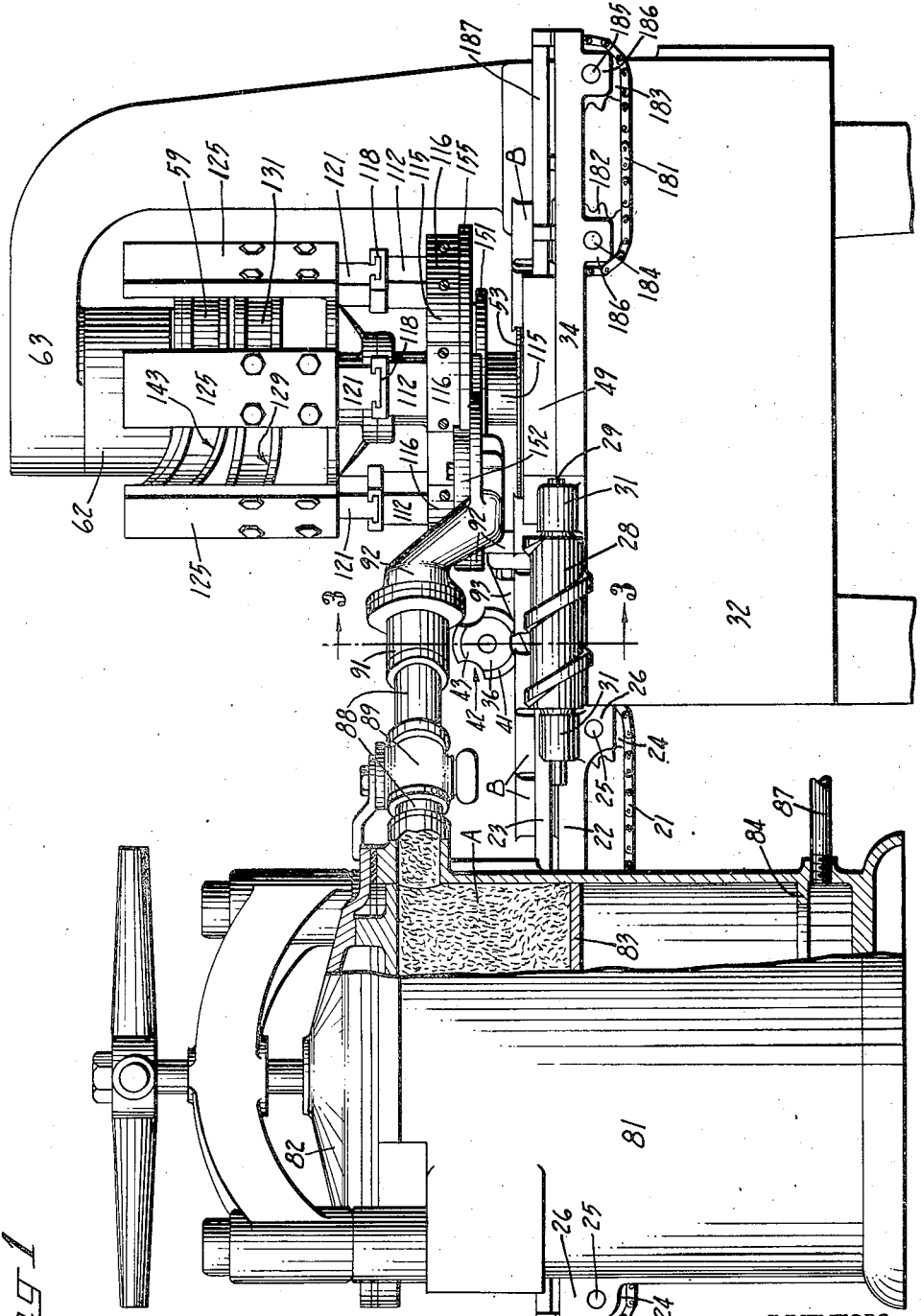
Fig 1
INVENTORS
Ronald E. J. Nordquist
Harvey L. Bryant
BY Ivan D. Thornburgh
Chas. H. Erne
ATTORNEYS

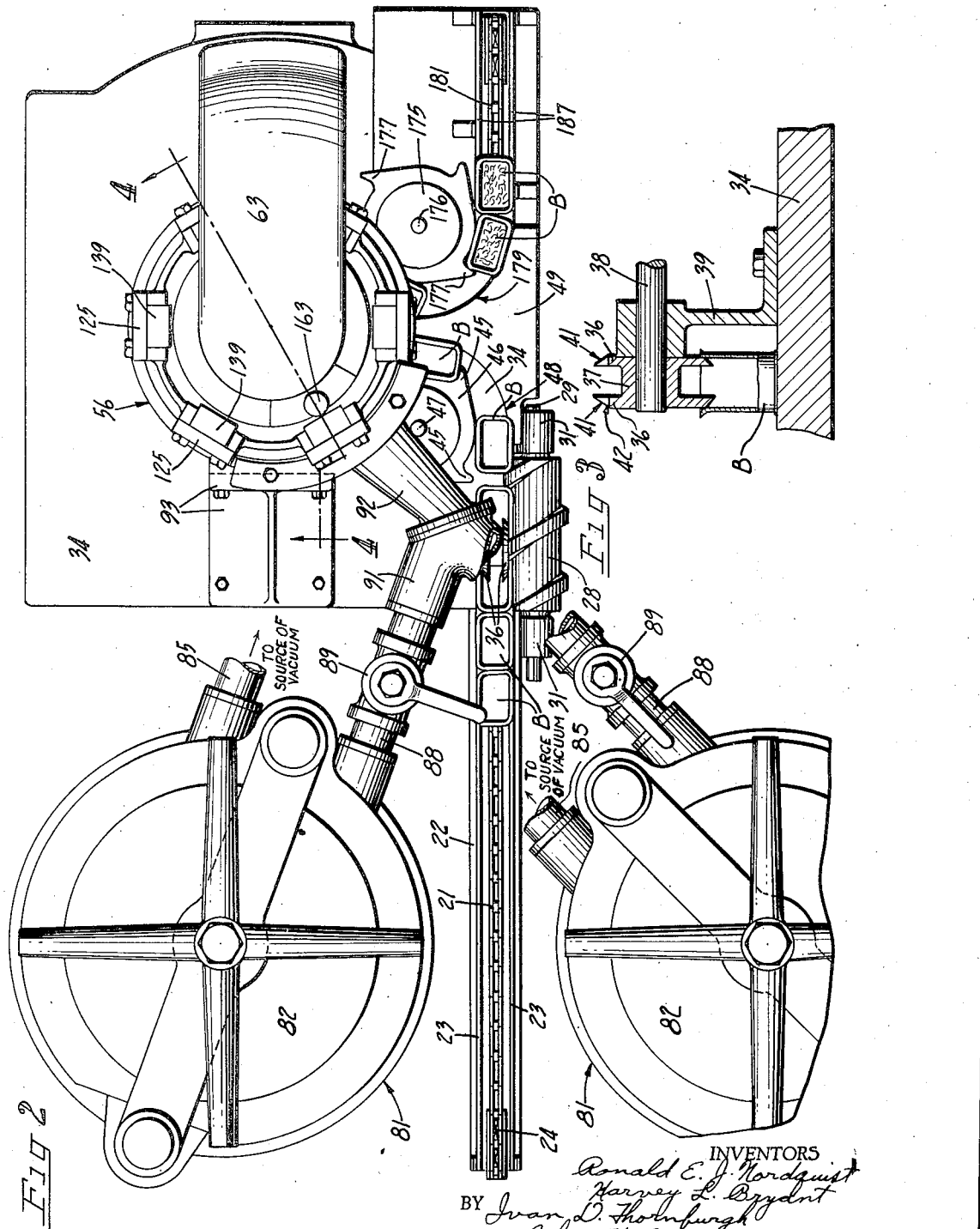

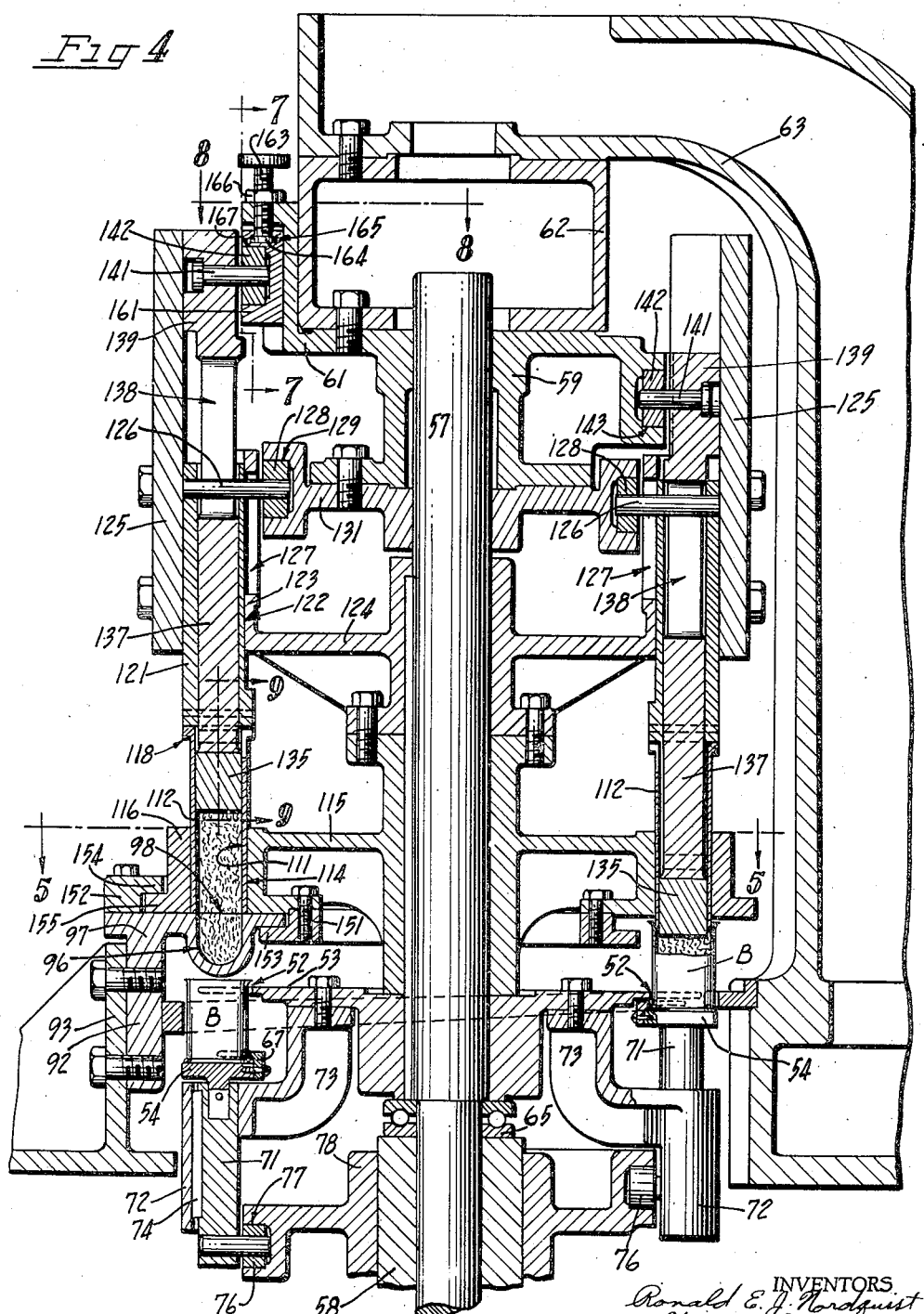

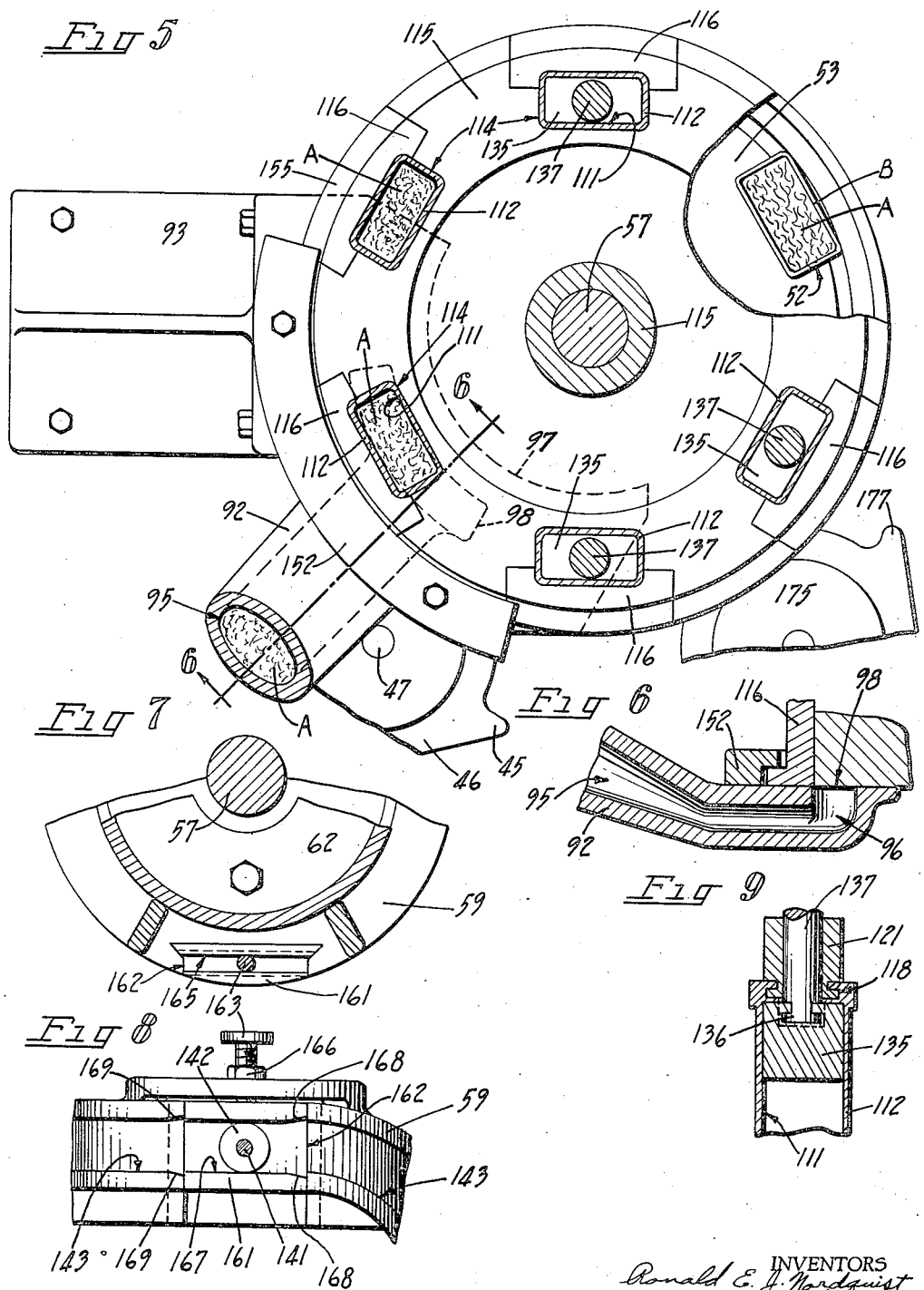

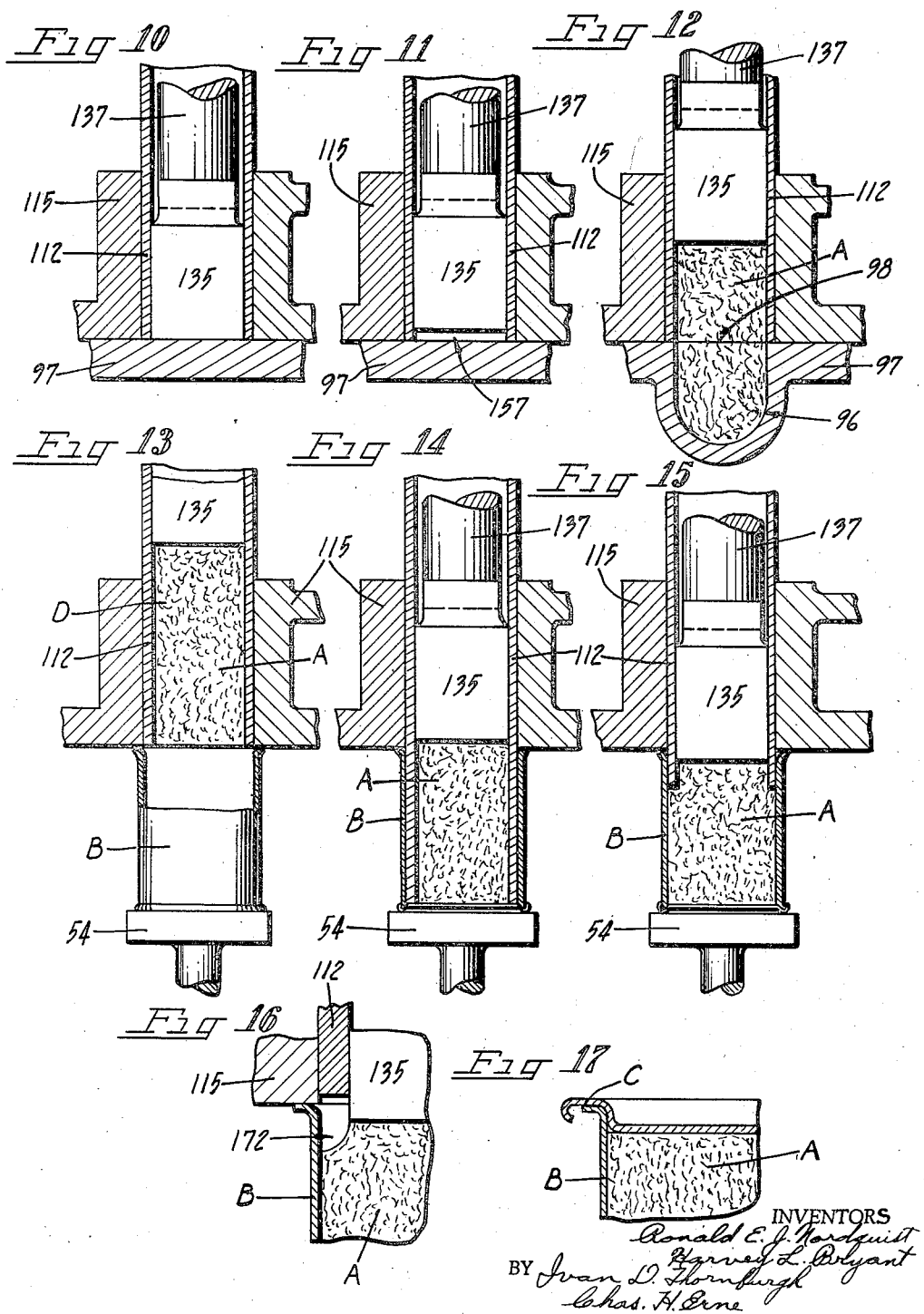

Patented Dec. 7, 1943

2,336,415

UNITED STATES PATENT OFFICE 2,336,415

CAN FILLING MACHINE

Ronald E. J. Nordquist, Maplewood, and Harvey L. Bryant, Roselle, N. J., assignors to American Can Company, New York, N. Y., a corporation of New Jersey Application June 18, 1941, Serial No. 398,666

10 Claims. (Cl. 226—101)

The present invention relates to container or can filling machines and has particular reference to filling minced meat and the like products into cans in such a manner that air pockets in the contents of the filled cans are eliminated.

In the packing of meat products into cans it has been found that due to the solid nature of the mass of meat and the difficulty in vacuumizing such a mass, small quantities of air are occasionally trapped in the bottom of the can during the filling process. This trapped air forms pockets in the meat and in time spoils the meat immediately adjacent such a pocket in addition to preventing a proper fill.

The instant invention contemplates overcoming this difficulty by filling the meat into the cans in such a manner that no air will be trapped, thus reducing or eliminating the spoilage of the meat.

An object therefore of the invention is the provision of a machine for filling meat products and the like into cans wherein the product to be filled into the can is compressed into a bottomless carrier and the carrier then is inserted within the can together with the meat following which it is withdrawn while the product is forced out of the carrier thereby filling the entire can and expelling any air contained therein with the withdrawing carrier so that no air will be trapped in the can with the product.

Another object is the provision of such a filling machine which in operation leaves the product in the top of the can spaced away from the side wall thereof adjacent the can flange so that no particles of the product will be trapped between the can walls and the cover which is subsequently applied thereto, thereby preventing leakage of air into the can through the joint which is formed to secure the cover to the can.

Numerous other objects and advantages of the invention will be apparent as it is better understood from the following description, which, taken in connection with the accompanying drawings, discloses a preferred embodiment thereof.

Referring to the drawings:

Figure 1 is a side elevation of a can filling machine embodying the instant invention, with parts broken away and parts shown in section;

Fig. 2 is a top plan view of the machine shown in Fig. 1, with parts broken away;

Fig. 3 is an enlarged sectional detail taken substantially along the line 3—3 in Fig. 1, with parts broken away;

Fig. 4 is an enlarged vertical section taken substantially along the broken line 4—4 in Fig. 2, with parts broken away;

Fig. 5 is a horizontal section taken substantially along the line 5—5 in Fig. 4, with parts broken away;

Fig. 6 is a sectional detail taken substantially along the line 6—6 in Fig. 5, with parts broken away;

Fig. 7 is a vertical section taken substantially along the line 7—7 in Fig. 4, with parts broken away;

Fig. 8 is a horizontal section taken substantially along the line 8—8 in Fig. 4, with parts broken away;

Fig. 9 is a sectional detail taken substantially along the line 9—9 in Fig. 4, with parts broken away;

Figs. 10 to 16, inclusive, are enlarged schematic sectional views of the can filling parts of the machine illustrating the parts in different postions incident to filling the product into a can, with Fig. 16 drawn at a greatly enlarged scale; and Fig. 17 is a sectional view of the upper corner of a filled can showing a cover in place prior to the latter being secured to the can.

As a preferred embodiment of the instant invention the drawings illustrate a machine for filling products A (Fig. 16) such as minced or spiced meat and the like into rectangular cans B (see also Fig. 1) to which a cover C (Fig. 17) is applied after filling and is secured to the can by an interfolding of flanged parts on both the can and the cover to form a suitable seam such as the well known double seam or the like.

The cans B to be filled with the product are introduced into the machine from any suitable source of such cams, in a continuous procession by way of an endless chain conveyor 21 (Figs. 1 and 2) which operates in an entrance runway 22. Guide rails 23 secured to the sides of the runway maintain the moving cans in a straight line. The conveyor operates over a pair of spaced sprockets 24 mounted on shafts 25 journaled in bearings 26 formed on the bottom of the runway. One of the sprockets may be a driving sprocket which is rotated in any suitable manner in time with the other moving parts of the machine.

The conveyor 21 advances the empty cans into position adjacent a spacing and timing screw 28 mounted on a horizontal shaft 29 journaled in bearings 31 formed in a frame 32 which constitutes the main frame of the machine. This frame supports the machine end of the runway 21. The screw is rotated in any suitable manner in time with the other moving parts of the machine.

As a can comes adjacent the timing screw 28, the latter further advances the can while accelerating its speed of travel along a table 34 formed on top of the machine frame. The screw thus spaces the cans apart and brings them into timed relation.

Among the cans entering the machine there are sometimes occasional cans which have their sides walls bent inwardly, which bending is often due to rough handling, and such can walls are straightened while the can is adjacent the timing screw 28. This straightening of the can walls is effected by a straightening device which includes a pair of spaced discs 36 (Figs. 1, 2 and 3) formed on a hub 37 located above the path of travel of the cans.

The hub 37 is mounted on a drive shaft 38 journaled in a bearing bracket 39 bolted to the machine table 34. The shaft is rotated in any suitable manner in time with the cans moving past the device. The periphery of the discs are formed with outer beveled edges 41 cut away at spaced intervals around the discs with clearance notches 42 which produce arcuate blades 43.

As a can passes below this straightening device a pair of the blades 43 rotate down into the can and the bevel edges 41 of the blades presses the sides of the can outwardly as clearly shown in Fig. 3. It is this action that straightens the can side walls and removes any inwardly bow or curve which the side walls may have. The clearance notches 42 provide for passing over the end walls of the can as the blade discs revolve in time with the moving can.

When a can B reaches the discharge end of the timing screw 28, it is engaged by a finger 45 (Fig. 2) of a rotating entrance star wheel 46. This further advances it along a curved path of travel. The star wheel is disposed in a horizontal position adjacent the end of the timing screw and is mounted on the upper end of a vertical shaft 47 journaled in suitable bearings formed in the machine frame 32. The shaft is rotated in any suitable manner in time with the other moving parts of the machine. A curved track 48 formed in a guide member 49 secured to the machine table 34, retains the can in position against the star wheel finger 45.

The entrance star wheel 46 delivers the empty can B from the table 34 into a pocket 52 (see Figs. 4 and 5) of a rotating can filling turret 53 and deposits the can on a lifter pad 54 located below and in vertical alignment with the pocket.

The filling turret 53 (Fig. 1) is located in a circular opening 56 (Fig. 2) in the table 34 and is mounted on a vertical turret shaft 57 (Figs. 4 and 5) journaled at its lower end in a bearing 58 formed in the machine frame 32 and at its upper end in a bearing 59 formed in a stationary barrel cam 61. The cam is secured to a spacer block 62 which is bolted to an overhanging column bracket 63. The bracket is bolted to the machine table 34 (see Figs. 1 and 2). The shaft 57 is rotated in any suitable manner in time with the other moving parts of the machine. A thrust bearing 65 interposed between the turret and the lower bearing 58, provides for free turning of the shaft.

The turret 53 is formed with a plurality of the can pockets 52 equally spaced around its periphery and each pocket has a can support-ing lifter pad 54. Each lifter pad is provided with a can locating and hold down member 67 which surrounds the can on three sides and engages over the bottom seam.

The lifter pads 54 are secured to the upper ends of vertically movable stems 71 which slide in a bearing 72 formed on brackets 73 bolted to the bottom of the turret 53. A key 74 in each stem retains the stem against turning in its bearing. The lower end of each stem carries a cam roller 76 which operates in a cam groove 77 of a stationary barrel cam 78 secured to the shaft bearing 58.

Hence as the shaft 57 rotates, it revolves the turret 53 and the lifter pads 54 as a unit, while the cam rollers 76 traverse the cam groove 77 and thus carry the cans deposited in the turret pockets through a circular path of travel around the shaft. During this travel of the can it moves into position to receive its charge of meat. The passage of this meat through the machine will now be considered.

The meat to be filled into the cans B preferably is contained in a pair of tanks or reservoirs 81 (Figs. 1 and 2). There are two of these tanks so that one may be opened and filled with meat while the other is feeding meat into the machine and in this way a continuous flow of meat may be maintained for filling. Each tank 81 is provided with a removable cover 82. Within each tank there is a false bottom 83 which when the tank is being filled, rests on a ledge 84 adjacent the true bottom of the tank.

After a tank is filled with meat and its cover is secured in place, the head space above the meat may be vacuumized by way of an outlet pipe 85 connected with a suitable source of vacuum. Vacuumizing of the tank head space removes the air which thus is prevented from entering the machine with the meat.

The meat is fed from the tank by air pressure which is exerted against the false bottom 83. The air under pressure is introduced into the tank adjacent its bottom by way of an air inlet pipe 87. This pipe leads from any suitable source of compressed air. The air entering adjacent the bottom of the tank lifts the false bottom 83 against the meat thereby compressing and forcing it out through a feed pipe 88 threaded into the side of the upper end of the tank adjacent the vacuum connection 85. This feed pipe contains a manually operated shut-off valve 89 which is open when meat is being fed from the tank and which is closed while refilling the tank and vacuumizing its head space preparatory to the filling operation.

The two feed pipes 88 from both of the tanks 81 lead into a Y connection 91 through which the meat passes into a connecting housing 92 (see also Figs. 4, 5 and 6). The housing is secured to a bracket 93 which is bolted to the machine table 34. The housing is formed with a conduit 95 through which the meat passes. This conduit merges into an arcuate trough 96 formed in an inner flat top table section 97 of the housing 92.

The inner table section is disposed adjacent the can feed-in star wheel 46 and is located directly above the path of travel of the cans fed into the pockets of the filling turret 53. The inner table section is formed with an elongated arcuate meat discharge opening 98 which communicates with the trough 96. It is through this opening that the meat passes in readiness to be filled into the cans B.

The meat thus received in the machine at a place adjacent passage of the empty cans B, is measured out into accurate charges before being filled into the cans. Each charge is just the correct amount to fill one can. This measuring of the meat is brought about by movable carrier elements or measuring chambers 111 formed within thin walled, open bottom vertical sleeves 112 which constitute carriers for the meat. There is one of these measuring sleeves for each pocket 52 of the filling turret 53. Each sleeve is carried directly above its pocket in vertical alignment with a can B in the pocket. The outside dimensions of the sleeve are slightly smaller than the inside dimensions of a can B so that the sleeve may readily pass into the can as will be later explained.

The measuring sleeves 112 are located in vertical slideways 114 formed in a measuring sleeve disc 115 which is keyed to and is rotated by the vertical turret shaft 57. Thus the disc and the measuring sleeves carried therein are rotated in time with the filling turret 53 while the sleeves are maintained in vertical alignment with the cans in the turret. Retaining caps 116 confine the measuring sleeves within their slideways.

Each measuring sleeve 112 is removably connected, adjacent its upper end and by way of a tongue and groove connection 118 (Figs. 4 and 9), to an actuating sleeve 121. The actuating sleeve is mounted in vertical slideways 122 formed in slideway blocks 123 formed in a disc 124 keyed onto the shaft 57 and bolted to the measuring sleeve disc 115. Thus both discs will rotate as a unit.

Retainer plates 125 bolted to the outer face of the slideway blocks confine the actuating sleeves 121 within their slideways. The upper ends of the actuating sleeves carry pins 126 which extend through vertical slots 127 formed in the slideway blocks. These pins carry cam rollers 128 which operate in a cam groove 129 of a stationary barrel cam 131 which surrounds the shaft 57 and which is bolted to the bottom of the barrel cam 59.

Thus as the rotating shaft 57 rotates the discs 115, 124 the cam rollers 128 traverse the cam groove 129 of the stationary cam 131. This movement of the rollers along the cam groove imparts a vertical movement to the actuating sleeves 121 and the sleeves thus raise and lower the measuring sleeves 112 relative to the can as they move around their circular path of travel.

Within each measuring sleeve 112 there is a vertically movable plunger 135 which is removably secured by way of a tongue and groove connection 136 to the lower end of a plunger rod 137. The plunger rod extends up through the actuating sleeve 121. An elongated slot 138 in the rod provides for clearance for the cam roller pin 126. The upper end of the rod is formed with a slide block 139 which slides against the inner face of the adjacent retainer plate 125 and prevents the rod from turning in its actuating sleeve.

The slide block 139 carries a pin 141 having on its inner end a cam roller 142 which operates in a cam groove 143 of the stationary barrel cam 59. This cam shifts the plunger rod and its plunger 135 vertically within its measuring sleeve 112 in time with the rotation of the shaft 57 to effect the meat measuring and filling operations as will now be explained.

Just prior to an empty can B being received for filling in a pocket 52 of the filling turret 53, the bottom edge of the measuring sleeve 112 above the can and the bottom of the plunger 135 within the sleeve are flush with the bottom of the measuring sleeve disc 115, as best shown in Fig. 10. The sleeve and the plunger take this position upon completion of a can filling operation and remain in such position for the beginning of the next filling operation. Such an operation begins by the sleeve and the plunger riding over the auxiliary table 97.

It will be remembered that the measuring sleeve disc 115 engages against the top of the auxiliary table 97 (Fig. 4) of the meat housing 92. The disc as it slides over this table is confined against vertical displacement by a ring 151 bolted to the disc and by a guide rail 152 bolted to the auxiliary table. The ring is formed with a flange 153 which engages under the table and the rail is formed with a flange 154 which engages over a flange 155 on the disc. Thus the bottom of the measuring sleeve and the bottom of the plunger slide across the table with the rotating disc so that no air is trapped within the sleeve.

When the measuring sleeve is fully on the auxiliary table 97, the plunger 135 rises within the sleeve to produce a small space 157 between the bottom of the plunger and the top of the table, as best shown in Fig. 11. This creates a vacuum within the measuring sleeve.

With the vacuum established in the lower portion of the measuring sleeve, the disc 115 brings the sleeve into registry with the meat discharge opening 98 in the auxiliary table. As the sleeve thus moves into registry, the meat under pressure in the trough 96, gushes upwardly into the vacuumized space in the sleeve and rapidly fills it. After the filling of this space the splunger rises within the sleeve under the influence of the cam 59 and thus maintains a pressure on the meat so that the latter will follow the plunger as it moves upwardly, as shown in Fig. 12. The discharge opening in the table is considerably longer than the opening in the bottom of the sleeve and hence the openings remain in registry for a sufficient time interval to permit the sleeve to be completely filled.

When the plunger reaches the top of its upward stroke as controlled by the cam 59, a predetermined amount of meat sufficient to fill the can B, has been forced up into the sleeve 112. The sleeve moving with the rotating disc 115 then shifts out of registry with the opening 98 as it slides along the auxiliary table. This action, utilizing the sharp edge of the table adjacent the opening as a knife, cuts off the meat along a clean line of severance (see Fig. 13) and thus leaves an accurately measured charge D of meat in the sleeve.

Provision is made for controlling the accuracy of this measuring operation so that the correct amount of meat to fill a can will be insured. This is brought about by an adjustable cam block 161 (Figs. 4, 7 and 8) which is mounted in a vertical slideway 162 formed in the periphery of the cam 59. The block is secured in place and is vertically movable by an adjusting screw 163 which is threaded into the cam. The lower end of the screw is formed with a head 164 which is disposed in a T-slot 165 cut in the top of the block while a locknut 166 is provided on the screw to lock it in an adjusted position.

The cam block 161 forms a part of the periphery of the cam 59 and is formed with a cam groove 167 which normally aligns with the groove 143 of the cam. Beveled edges 168, 169 on the block and on the cam, respectively, permit the cam roller 142 to roll from the groove 143 into the groove 167 and back again into the groove 143 without difficulty. By vertically adjusting the block the upward stroke of the plunger 135 within its sleeve 112 may be regulated to permit the desired predetermined quantity of meat to enter the sleeve.

When a measured charge D of the meat has thus been segregated in the measuring chamber 111 of the sleeve 112, the disc 115 carries the sleeve off the auxiliary table 97. Simultaneously with this action the empty can B on its lifter pad 54 moves up into engagement wtih the bottom of the disc directly under the filled measuring sleeve, as best shown in Fig. 13. This lifting of the can is effected by the lifter cam 78.

As the measuring sleeve disc 115 and the can turret 53 continue to rotate, the measuring sleeve 112 and the plunger 135 move down as a unit into the can B. This action carries the meat down into the can. As these parts move down into the can the air in the can is displaced, the air flowing around the outside of the sleeve. The sleeve with the plunger and meat continues to descend into the can until it strikes its bottom, as best shown in Fig. 14, and this insures full displacement of the air.

Upon striking the bottom of the can the sleeve 112 begins to move upwardly while the plunger 135 continues to move down. This pushes the meat out of the sleeve and forces it sidewise against the bottom and sides of the can and into the space previously occupied by the sleeve so that all air is displaced from the can. As the rising sleeve continues to withdraw from the can, the plunger continues to descend but at a slower rate of speed so that the meat will follow up along the sides of the can under the withdrawing sleeve, as best shown in Fig. 15. Owing to the plastic nature of the meat, air is positively prevented from being trapped in the can together with the meat.

When the lower edge of the sleeve 112 nearly reaches the top flange end of the can, it passes or moves above the bottom of the plunger 135. The plunger thereupon ceases its downward movement and begins to move upwardly with the sleeve. The meat clinging to the bottom of the plunger is drawn inwardly away from the sides of the can and this forms an annular clearance recess 172 (Fig. 16) which extends entirely around the can adjacent its flange. With continued upward movement of the plunger, the meat breaks away from its bottom surface and leaves the clearance recess 172 undisturbed.

This recess 172 prevents any of the meat from engaging against the sides of the can at the can end flange area so that when a cover C is subsequently applied to the can (as shown in Fig. 17) the meat will not be embodied in the usual seam which subsequently is formed to secure the cover to the can. Thus leaks in the seam from this source are prevented. It should be noted (Fig. 17) that at the time the cover is applied preparatory to the sealing or seaming action that the meat is thus forced radially outwardly and fills the recess 172, thereby eliminating the recess and forcing out the air contained therein so that no head space and hence no air remains in the can. This subsequent application of the cover is performed in another machine which forms no part of the present invention.

The breaking away of the meat from the plunger 135 completes the can filling operation in this machine and the sleeve 112 and the plunger thereupon return to their original position flush with the bottom of the disc 115 in readiness for a subsequent filling operation. The filled can is thereupon lowered away from contact with the bottom of the disc 115 and is returned to its original level.

During this filling of the can it has been carried almost completely around its circular path of travel and now moves adjacent a discharge star wheel 175 (Fig. 2) which is disposed adjacent the entrance star wheel 46. The discharge star wheel 175 is mounted on a vertical shaft 176 journaled in the machine frame 32 and is rotated in any suitable manner in time with the other moving parts of the machine.

The discharge star wheel 175 is formed with spaced fingers 177 which engage behind the filled cans B and slide them off their lifter pad 54 onto the machine table 34. The wheel propels the cans across the table through a curved path of travel guided by a curved section 179 of the guide plate 49. The filled cans thus removed from the can turret are deposited by the star wheel onto an endless chain conveyor 181 (see also Fig. 1) which carries them to any suitable place of deposit for subsequent sealing with their covers C as hereinbefore explained.

The conveyor 181 operates over a pair of spaced sprockets 182, 183 mounted on respective shafts 184, 185 journaled in bearing blocks 186 which depend from the machine table 34. One of the sprockets may be a driving sprocket which may be rotated in any suitable manner in time with the other moving parts of the machine. Guide rails 187 adjacent the conveyor maintain the filled cans in alignment while they are being discharged from the machine.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. In a machine for filling meat products and the like into containers, the combination of a rotatable structure, a carrier element having an open bottom supported in said rotatable structure for receiving and for carrying into a container a charge of the product, a plunger within said carrier element, a turret movable in time with said rotatable structure and having a pocket for positioning the empty container in alignment with said carrier element, a lifter pad on which the container is supported while in the turret, said lifter pad being operable to shift the empty container into position adjacent the carrier element, means for inserting the carrier element and its product charge into the positioned container and for withdrawing it therefrom, and actuating devices for actuating said plunger in time with the withdrawal of said carrier element to transfer the product charge from the element to the container as the carrier element is withdrawn from the container.

2. In a machine for filling meat products and the like into containers, the combination of a rotatable structure, a carrier element having an open bottom supported in said rotatable structure for receiving and for carrying into a container a charge of the product, a plunger disposed within said carrier element and movable relative thereto, a turret movable in time with said rotatable structure and having a pocket for positioning the empty container in alignment with said carrier element, a lifter pad on which the container is supported while in the turret, said lifter pad being operable to shift the empty container into position adjacent the carrier element, means for inserting the carrier element and its product charge into the positioned container and for withdrawing said element therefrom, actuating devices for moving said plunger relative to said carrier element to transfer the product charge from the element to the container as the carrier element is withdrawn from the container, and container holding instrumentalities on said lifter pad for holding the container against displacement while the carrier element is being withdrawn from the container.

3. In a machine for filling meat products and the like into containers, the combination of a table, a conduit formed on said table and having a discharge opening in said table, means for feeding the product under pressure through said conduit and through its discharge opening, a rotatable disc structure engaging said table, a carrier sleeve element movably disposed in said disc structure and having an open bottom designed to be moved into registry with said discharge opening in the table when the disc structure rotates to receive and measure out a charge of the product from said conduit for filling into a container, a plunger within said carrier sleeve element, said plunger being flush with said table when the disc structure rotates the carrier element into position thereon, and actuating devices operating in time with the rotation of said disc structure to move the plunger into the carrier element prior to the registration of the element with the table discharge opening to create a vacuum within the element and to draw the plunger further into the element when the plunger moves into registry with the discharge opening, whereby to control the entrance of the product into the carrier element.

4. In a machine for filling meat products and the like into containers, the combination of a table, a conduit formed on said table and having a discharge opening in said table, means for feeding the product under pressure through said conduit and through its discharge opening, a rotatable disc structure engaging said table, a carrier sleeve element movably disposed in said disc structure and having an open bottom which is brought into register with said discharge opening in the table when the disc structure rotates to receive and measure out a charge of the product from said conduit, holding instrumentalities on said table and on said disc structure to hold these parts in hermetic engagement during the feeding of the product into the carrier element, mechanism for bringing an empty container into position adjacent the open bottom of the charged carrier element, a plunger within said carrier element, means for inserting the carrier element and its product charge into the positioned container and for withdrawing it therefrom, and actuating devices for actuating said plunger in time with the withdrawal of said carrier element to transfer the product charge from the element to the container as the carrier element is withdrawn from the container.

5. In a machine for filling meat products and the like into containers, the combination of a stationary table, a tubular carrier element having an opening in an end thereof for receiving and carrying a charge of the product to be filled into a container, means for moving said carrier element in a circular path of travel over the surface of said table, means for vertically reciprocating said carrier element in time with its circular movement so as to render said element insertable into and removable from a container disposed beneath said table, a plunger disposed in and movable with said carrier element, and actuating devices for moving said plunger relative to and in time with the withdrawal of said carrier element from said container to force the product out through the end opening of said carrier element and into the container as the carrier element is withdrawn therefrom, whereby to prevent air pockets from being formed between the product and the walls of the container.

6. In a machine for filling meat products and the like into containers, the combination of a stationary table, a tubular carrier element having an open bottom and enclosing a measuring chamber, means for moving said carrier element in a circular path of travel over the surface of said table, a plunger disposed within and movable with said carrier element and forming a limiting wall enclosing said measuring chamber, means for adjusting said plunger within said carrier element to produce a desired volume in said measuring chamber, mechanism for feeding the product into said measuring chamber to segregate a charge to be filled into a container disposed beneath said table, means for vertically reciprocating said carrier element in time with its circular movement to render the carrier element and its measured charge insertable into the empty container and removable therefrom, and actuating devices for moving said plunger in time with the withdrawal of said carrier element to force the product out through the bottom opening in the carrier element and into the container as the carrier element is withdrawn from the container, whereby to prevent air pockets from being formed in the product and in the container.

7. In a machine for filling meat products and the like into containers, the combination of a vertically disposed tubular carrier element having means for vertically inserting the same into a container to be filled, said carrier element having an open bottom end for receiving a charge of said product and for transferring said charge into the container, means for charging said product under pressure into the open bottom end of said carrier element to fill the latter, a support member for said carrier element, a plunger disposed in the upper end of said carrier element, a support member for said plunger, means for actuating said carrier element support member to withdraw the element from the container, actuating devices for moving said plunger support member and the plunger in time with the withdrawal of the carrier element from the container to transfer the product charge from the element to the container, and a separate connection between said carrier element and its support member and between the plunger and its support member so that the carrier element and the plunger may be readily disengaged from their support members for cleaning and sterilizing.

8. In a machine for filling meat products and the like into containers, the combination of a table, a conduit formed on said table and having a discharge opening in said table, means for feeding the product under pressure through said conduit and its discharge opening, a rotatable disc structure engaging said table, a carrier sleeve element movably disposed in said disc structure and having an open bottom adapted to be moved into registry with said discharge opening in the table when the disc structure rotates to receive and measure out a charge of the product from said conduit, the edge of said table adjacent and defining said discharge opening serving to cut off the measured charge of the product in the carrier sleeve element as the disc structure rotates the element out of registry with the discharge opening, mechanism for moving an empty container into position adjacent the open bottom of the charged carrier element, a plunger within said carrier element, means for inserting the carrier element and its product charge into the positioned container and for withdrawing it therefrom, and actuating devices for actuating said plunger in time with the withdrawal of said carrier element to transfer the product charge from the element to the container as the carrier element is withdrawn from the container.

9. In a machine for filling meat products and the like into containers, the combination of a vertically disposed tubular carrier element having an opening in its lower end for receiving and carrying a charge of the product to be filled into a container, said carrier element being insertable into the container, a conduit disposed below said carrier and communicating with the lower end thereof for feeding the product under pressure into said lower end opening of said carrier element, a plunger disposed in the upper end of said carrier element, means for withdrawing said carrier element from the container, actuating devices for actuating said plunger in time with the withdrawal of said carrier element to force the product out through the opening in the carrier element and into the container as the carrier element is withdrawn therefrom to prevent formation of air pockets in the product, a plurality of product storage tanks conecting with said conduit for feeding the product thereinto, a cut-off valve between each tank and the conduit so that a tank when it becomes empty may be cut out for refilling while a full tank may be connected to continue the feeding of the product without interruption, and means for vacuumizing the head space in a refilled tank to prevent air from entering the conduit with the product when the refilled tank is connected.

10. In a machine for filling meat products and the like into containers, the combination of a vertically disposed tubular carrier element having an opening in its bottom end for receiving and carrying a charge of the product to be filled into a container, means for introducing said product under pressure into the bottom end of said carrier, said carrier element being insertable into the container, mechanism for advancing the empty container along a predetermined path of travel and into position beneath said carrier element, devices disposed adjacent the path of travel of the container for straightening a bent side wall thereof, a plunger disposed in the upper portion of said carrier element, means for withdrawing said carrier element from the container, and actuating devices for actuating said plunger in time with the withdrawal of said carrier element to force the product out through said carrier element opening and into the container as the carrier element is withdrawn from the container to prevent formation of air pockets in the product.

RONALD E. J. NORDQUIST.
HARVEY L. BRYANT.